US005581652A

United States Patent [19]

Abe et al.

[11] Patent Number: 5,581,652

[45] Date of Patent: Dec. 3, 1996

[54] RECONSTRUCTION OF WIDEBAND SPEECH FROM NARROWBAND SPEECH USING CODEBOOKS

[75] Inventors: Masanobu Abe; Yuki Yoshida, both of Yokosuka, Japan

[73] Assignee: Nippon Telegraph and Telephone Corporation, Tokyo, Japan

[21] Appl. No.: 128,291

[22] Filed: Sep. 29, 1993

[30] Foreign Application Priority Data

Oct. 5, 1992 [JP] Japan .................................. 4-266086

[51] Int. Cl.[6] .................................................. G01L 9/00

[52] U.S. Cl. ......................... 395/2.31; 395/229; 395/2.32

[58] Field of Search ............................... 395/2, 2.1, 2.14, 395/2.2, 2.28–2.32, 2.67, 2.71., 2.73, 2.76, 2.77; 381/36–41, 47, 51

[56] References Cited

U.S. PATENT DOCUMENTS

| | | | |
|---|---|---|---|
| 4,296,279 | 10/1981 | Stork | 395/2.73 |
| 4,330,689 | 5/1982 | Kang et al. | 395/2.71 |
| 4,701,955 | 10/1987 | Taguchi | 395/2.32 |
| 4,776,014 | 10/1988 | Zinser, Jr. | 395/2.73 |
| 4,956,871 | 11/1990 | Swaminathan | 395/2.35 |
| 4,963,030 | 10/1990 | Makur | 395/2.35 |
| 5,046,099 | 9/1991 | Nishimura | 395/2.35 |
| 5,271,089 | 12/1993 | Ozawa | 395/2.35 |
| 5,293,449 | 3/1994 | Tzeng | 395/2.28 |
| 5,353,374 | 10/1994 | Wilson et al. | 395/2.28 |
| 5,371,853 | 12/1994 | Kao et al. | 395/2.32 |
| 5,432,883 | 7/1995 | Yoshihara | 395/2.71 |

*Primary Examiner*—Allen R. MacDonald
*Assistant Examiner*—Michael A. Sartori
*Attorney, Agent, or Firm*—Pollock, Vande Sande & Priddy

[57] ABSTRACT

A wideband speech signal (8 kHz, for example) of high quantity is reconstructed from a narrowband speech signal (300 Hz to 3.4 kHz). The input narrowband speech signal is LPC-analyzed to obtain spectrum information parameters, and the parameters are vector-quantized using a narrowband speech signal codebook. For each code number of the narrowband speech signal codebook, the wideband speech waveform corresponding to the codevector concerned is extracted by one pitch for voiced speech and by one frame for unvoiced speech and prestored in a representative waveform codebook. Representative waveform segments corresponding to the respective output codevector numbers of the quantizer are extracted from the representative waveform codebook. Voiced speech is synthesized by pitch-synchronous overlapping of the extracted representative waveform segments and unvoiced speech is synthesized by randomly using waveforms of one frame length. By this, a wideband speech signal is produced. Then, frequency components below 300 Hz and above 3.4 kHz are extracted from the wideband speech signal and are added to an up-sampled version of the input narrowband speech signal to thereby reconstruct the wideband speech signal.

16 Claims, 11 Drawing Sheets

PRIOR ART

RECONSTRUCTION OF WIDEBAND SPEECH FROM NARROWBAND SPEECH USING CODEBOOKS

BACKGROUND OF THE INVENTION

The present invention relates to a method for reconstructing a wideband speech signal from an input narrowband speech signal and, more particularly, to a method and an apparatus whereby a narrowband speech signal like present telephone speech or output signal from an AM radio can be graded up to a wideband speech signal like an output signal from an audio set or FM radio.

Telephone speech will be described as an example of the narrowband speech signal. The spectrum band of a signal that the existing telephone system can transmit is in the range of from about 300 Hz to 3.4 kHz. Conventional speech coding techniques are intended to keep the quality of speech in this telephone band and minimize the number of parameters that must be transmitted. Thus, it is possible with the conventional speech coding techniques to reconstruct band-limited input speech but impossible to obtain higher quality speech.

In Japanese Patent Application Laid-Open No. 254223/91 entitled "Analog Data Transmission System" there is proposed a system which transmits analog data after removing its high-frequency component at the transmitting side and reconstructs the high-frequency component at the receiving side through use of a neural network pre-trained in accordance with characteristics of the data. While this system transmits a narrowband signal of only the low-frequency band over the transmission line with a view to efficiently utilizing its transmission band, it can be said that at the receiving side the high-frequency component is reconstructed from the narrowband signal of the low-frequency component to recover the original wideband signal. The speech signal includes, however, spectrum information, pitch information and phase information, and it is unknown for which information the neural network has been trained; hence, there is no guarantee of correct reconstruction of the high-frequency component with respect to the data for which the network has not been trained. To train the neural network for all of such pieces of information, it is necessary to significantly increase the number of intermediate or hidden layers and the number of units of each layer—this makes it very difficult, in practice, to train the neural network.

With the recent progress of acoustics technology and development of digital processing, the quality of sound in everyday life has been improved and it has come to be said that the quality of speech in the telephone band at present is not satisfactory to many people. One possible solution to this problem is to replace the existing telephone system with a new one that permits the transmission of wideband signals, but this consumes considerable time as well as involves enormous construction costs.

It is therefore a primary object of the present invention to provide a wideband speech signal reconstruction method and apparatus which permit reconstruction of a wideband speech signal from an input narrowband speech signal transmitted with a view to efficient utilization of the existing telephone system, for instance, and which allow the use of a wideband speech signal even in a situation of the combined use of a wideband telephone system capable of transmitting a wideband signal and the existing narrowband telephone system.

SUMMARY OF THE INVENTION

According to an aspect of the present invention: in a first step an input narrowband speech signal is analyzed to obtain spectrum; in a second step the spectrum results are vector-quantized using a prepared narrowband speech signal codebook; in a third step the vector-quantized values or codes are decoded using a prepared wideband speech signal codebook; and in a fourth step using the decoded values or codes a wideband speech signal is synthesized. The narrowband speech signal codebook is generated using narrowband speech signals and the wideband speech signal codebook is similarly generated using wideband speech signals; where codevectors of one codebook have one-to-one correspondence to codevectors of the other codebook.

In another aspect of the present invention: in a fifth step the input narrow speech signal is up-sampled; in a sixth step frequency components outside the frequency band of the input narrowband speech signal are extracted from the wideband speech signal obtained in the fourth step; and in a seventh step the extracted out-of-band components and the up-sampled signals obtained in the fifth step are added together to obtain a wideband speech signal.

The narrowband speech signal codebook and the wideband speech signal codebook are associated with each other in such a manner as described below. A training wideband speech signal is down-sampled and then filtered to obtain a training narrowband speech signal. These training wideband and narrowband speech signals are respectively analyzed to obtain spectrum and the spectrum of the wideband speech signal are vector-quantized into code numbers, using the aforementioned wideband speech signal codebook. The quantized results, i.e. the code numbers, and the spectrum of the narrowband speech signal are associated with each other for each analysis frame. The spectrums of the narrowband speech signal are classified into clusters, that is, the spectrums of the narrowband speech signal are collected for each quantized code, and then the collected spectrums are averaged for each code or cluster to obtain codevectors, which are used to form the narrowband speech signal codebook.

According to another aspect of the present invention: in a first step an input narrowband speech signal is analyzed to obtain spectrum; in a second step the spectrum are vector-quantized using a prepared narrowband speech signal codebook; and in a third step the vector-quantized values or codes are reconstructed into a wideband speech signal, using a prepared representative waveform codebook.

In another aspect of the present invention: in a fourth step the input narrowband speech signal is up-sampled; in a fifth step frequency components outside the input narrowband speech signal are extracted from the wideband speech signal obtained in the third step; and in a sixth step the thus extracted out-of-band components are added to the up-sampled signals to provide a wideband speech signal.

The above-mentioned representative waveform codebook is produced in such a manner as described below. A training wideband speech signal is analyzed to obtain spectrum; and the spectrum are matched with a prepared wideband speech signal codebook. For each codevector of the codebook, the waveform of the training wideband speech signal, where spectrum is the closest to the spectrum of the codevector is extracted by one pitch in the case of voiced speech and by one or two analysis window lengths in the case of unvoiced speech, and the thus extracted waveform is used as a representative waveform segment of the codevector.

According to still another aspect of the present invention: in a first step an input narrowband speech signal is analyzed to obtain spectrum; in a second step the spectrum are vector-quantized into code numbers, using a prepared narrowband speech signal codebook; in a third step the code numbers are decoded to codevectors using a prepared wideband speech signal codebook and using the thus decoded codevectors, wideband speech signal is synthesized; in a fourth step frequency components lower than the input narrowband speech signal are extracted from the synthesized wideband speech signal to reconstruct a low-frequency signal; in a fifth step a high-frequency signal is reconstructed, for each code number obtained in the second step, using a prepared representative waveform codebook which contains frequency components higher than the narrowband speech signal; in a sixth step the input narrowband speech signal is up-sampled; and in a seventh step the up-sampled signal, the reconstructed low-frequency signal and the reconstructed high-frequency signal are added together to obtain a wideband speech signal.

DESCRIPTION OF THE PREFERRED EMBODIMENTS

Figure 1:
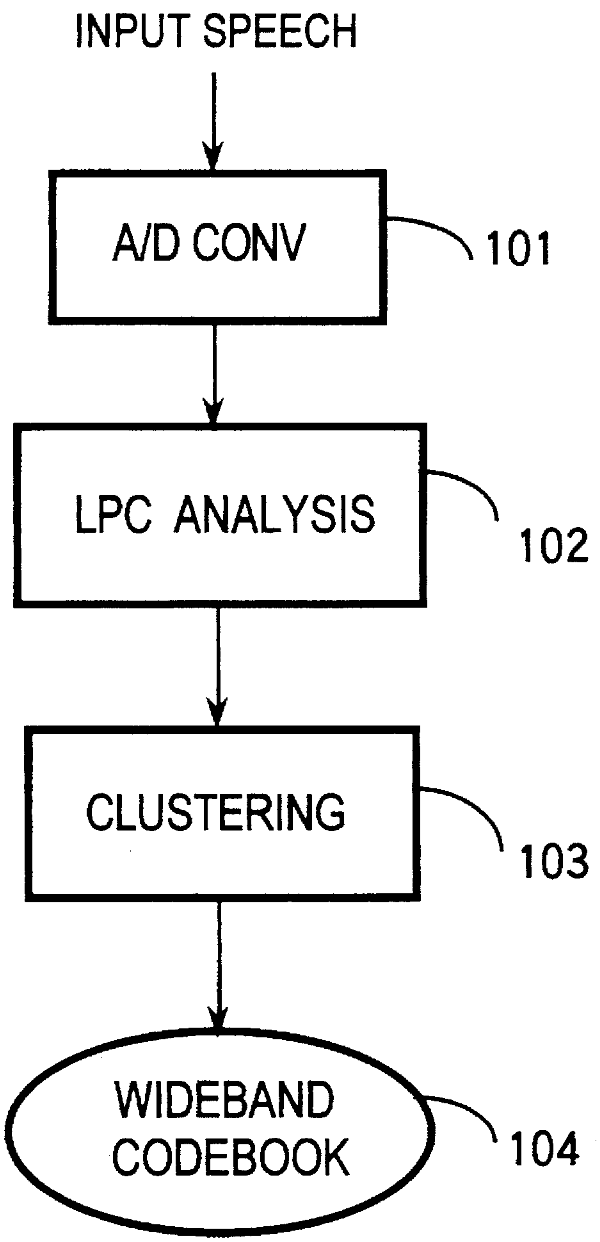
FIG. 1 is a diagram showing the procedure for generating a wideband speech signal codebook.

A description will be given first, with reference to FIG. 1, of the procedure for creating a wideband speech signal codebook that is used in the present invention. This procedure is well-known in the art. To efficiently express features of a training wideband speech signal, parameters that appropriately express features of the wideband speech signal are classified into clusters, which are used to provide the codebook. Parameters that can be used to characterize a speech signal are speech spectrum envelopes by linear predictive coding (LPC) and an FFT cepstrum analysis method and parameters by a PSE speech analysis-synthesis method and a speech expression method using sine waves. This example will be described in connection with the case of using the speech spectrum envelopes by LPC as such feature parameters. The codebook generating procedure starts with step 101 wherein an input training wideband speech signal of an 8 kHz band, for instance, is converted by an analog-to-digital (A/D) converter to a digital signal. Then, in step 102 the digital signal is subjected to an LPC analysis to obtain a parameter such as spectrum data (an auto-correlation function and an LPC cepstrum coefficients). These parameters are collected from a sufficiently large number of words, say, 200 words. Then, in step 103 the parameters thus collected are classified into clusters. This clustering is performed through use of an LBG algorithm, and the acoustic distance measure that is utilized in the clustering is a Euclidean distance of an LPC cepstrum as shown below by Eq. (1).

$$D=\sum_{i=1}^{p}[C(i)-C'(i)] \qquad (1)$$

where C and C' are LPC cepstrum coefficients obtained by LPC analysis of different speech signals and p is the order of the LPC cepstrum coefficient.

Incidentally, the above-mentioned LBG algorithm is described in detail in Linde, Buzo, Gray, "An Algorithm for Vector Quantization Design," IEEE COM-23 (1980-01).

The above equation (1) is used to obtain a wideband speech signal codebook 104.

According to a first aspect of the present invention, a narrowband speech signal codebook, which is associated with the wideband speech signal codebook 104, is utilized. With reference to FIG. 2 an example of generating the narrowband speech signal codebook will be described while maintaining its correspondence to the wideband speech signal codebook 104. This processing is intended to pre-obtain signal features that are absent in an input narrowband speech signal but ought to present in a wideband speech signal that will ultimately be output. The process begins with down-sampling of a training wideband speech signal in step 200, followed by step 201 wherein the resulting sample values are used to extract, from the training wideband speech signal, a signal of the same band as that of the input narrowband speech signal. The down-sampling is described in L. Rabiner, R. Schafer, "Digital Processing of Speech Signal," Chapter 2, Prentice-Hall, Inc., 1978, for example. This embodiment will be described on the assumption that the training wideband speech signal is a speech signal of the 8 kHz band and the narrowband speech signal is a speech signal of the telephone band (300 Hz to 3.4 kHz). Hence, in step 201 a narrowband speech signal is produced by passing the training wideband speech signal through a high-pass filter that removes frequencies below 300 Hz and a low-pass filter that removes frequencies above 3.4 kHz. On the other hand, the input training wideband speech signal is subjected to LPC analysis in step 202, after which in step 203 the analyzed values are vector-quantized using the wideband speech signal codebook 104 that was obtained following the procedure described above in respect of FIG. 1.

Figure 3:
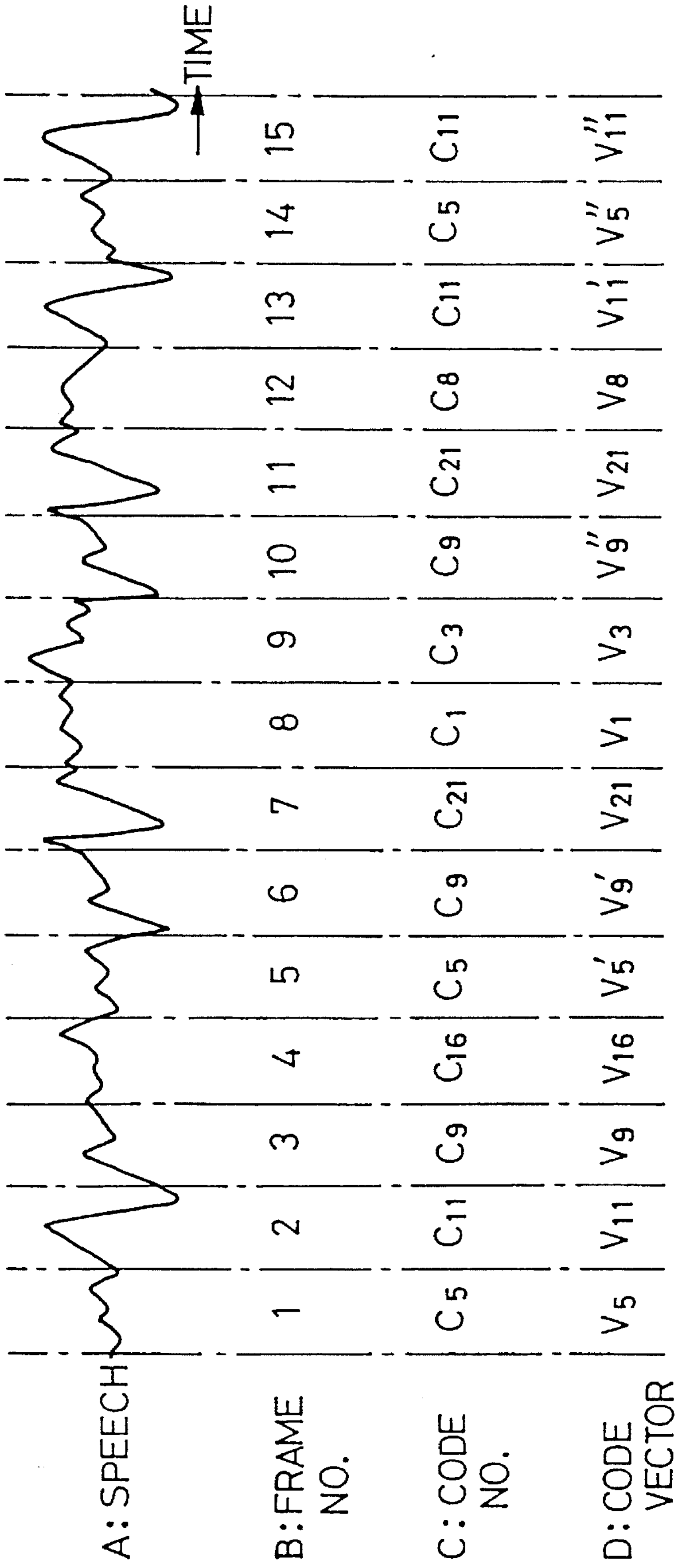
FIG. 3 is a diagram for explaining the operations involved in the procedure of FIG. 2.

Incidentally, since the narrowband speech signal is one that has been derived from the wideband speech signal, the temporal correspondence between these signals can be made a one-to-one correspondence between their LPC analysis frame numbers. Hence, the narrowband speech signal corresponding to the training wideband speech signal that was vector-quantized in step 203 is obtained for each frame in step 201, and the thus obtained narrowband LPC analyzed in step 205, after which in step 206 the analyzed values are classified and stored for each of codevector number obtained by the vector quantization in step 203. That is, let it be assumed that a wideband speech signal, shown in FIG. 3, Row A, is quantized in step 203 for respective frames Nos. 1, 2, 3, . . . shown in FIG. 3, Row B to obtain codes $C_5$, $C_{11}$, $C_9$, . . . as depicted in FIG. 3, Row C and that vectors $V_5$, $V_{11}$, $V_9$, . . . , obtained by the LPC analysis of the narrowband speech signal derived from the wideband speech signal shown in FIG. 3, Row A are obtained in correspondence to the frames Nos. 1, 2, 3, . . . as depicted in FIG. 3, Row D. Then, LPC-analyzed vectors, for example, $V_5$, $V_5'$, $V_5''$, . . . of respective narrowband speech signals, obtained for the same code No. $C_5$, are collected and stored; similarly, vectors $V_{11}$, $V_{11}'$, $V_{11}''$, . . . for the code No. $C_{11}$ are collected and stored. In this way, the LPC-analyzed vectors of the respective narrowband speech signal are collected and stored for all of the code numbers of the wideband speech signal codebook 104. The processing from step 201 to step 206 is performed for all training wideband speech signals corresponding to 200 words, for instance. In step 207 the LPC-analyzed values stored or retained in step 206 through the above-described processing are averaged for each cluster (for each code number) and then a narrowband speech signal codebook 208 is produced using the averaged values as codevectors corresponding to the respective code numbers.

Next, a description will be given, with reference to FIG. 4, of a first embodiment of the present invention which reconstructs a wideband speech signal from an input narrowband speech signal through utilization of the wideband speech signal codebook 104 and the narrowband speech signal codebook 208 associated with each other as described above. The input narrowband speech signal is LPC-analyzed by an LPC analyzer 301 and the obtained parameters are subjected to fuzzy vector quantization by quantizer 302 using the narrowband speech signal codebook 208. The fuzzy vector quantization is described in H. Tseng, M. Sabin, E. Lee, "Fuzzy Vector Quantization Applied to Hidden Markov Modeling," ICASSP'87 15.5 Apr. 1987. To reduce the computational quantity involved, the processing by the quantizer 302 may be ordinary vector quantization. This embodiment will be described to employ fuzzy vector quantization with a view to synthesizing smoother speech signals. The fuzzy vector quantization is a scheme that approximates an input vector with k codevectors close thereto as shown below by Eq. (2) and the output is a fuzzy membership function $u_i$.

$$u_i = \frac{1}{\sum_{j=1}^{k} \left( \frac{d_i}{d_j} \right)^{\frac{1}{m-1}}} \quad (2)$$

where $d_i$ is the Euclidean distance between the input vector and that one $V_i$ of the k codevectors in the codebook 208 which is close to the input vector, and m is a constant that determines the degree of fuzziness.

Then, fuzzy-vector-quantized codes from the quantizer 302 by decoded 304 using the wideband speech signal codebook 104 as shown below by Eq. (3).

$$X' = \frac{\sum_{i=1}^{k} u_i^m V_i}{\sum_{i=1}^{k} u_i^m} \quad (3)$$

where X' is the decoded vector.

The decoded output X' is LPC-synthesized by a speech synthesizer 306 to obtain a wideband speech signal. That is, an excitation signal, which depends on the pitch obtained from the LPC-analyzed values by the LPC analyzer 301, is used to drive a synthesis filter and its filter coefficient is controlled in accordance with the decoded output X'. Speech power is set to the values obtained by the LPC analyzer 301. This synthetic speech signal may be output as a reconstructed wideband speech signal.

The wideband speech signal thus produced is one that contains signal components outside the frequency band of the input narrowband speech signal and also contains, inside the band of the input narrowband speech signal, signal components different therefrom, and these signal components distort the input narrowband speech signal. In view of this, the processing described below is performed so that the signals primarily present in the input narrowband speech signal are used intact. That is, the wideband speech signal synthesized by the LPC analyzer 306 is applied to a band-pass filter 307 to extract components outside the band of the input narrowband speech signal, that is, frequency components below 300 Hz and those above 3.4 kHz. On the other hand, the input narrowband speech signal is up-sampled by an up-sampler 308 to the 8 kHz band. The output from the up-sampler 308 and the extracted components from the band-pass filter 307 are added together by an adder 309 to thereby obtain a reconstructed wideband speech signal. Incidentally, the up-sampling is carried out by applying the input narrowband speech signal to an allpass filter after inserting a "zero" sample between adjacent sample points and then by sampling the filter output at a twofold speed to double the frequency band of the speech signal. This up-sampling is described in L. Rabiner, R. Schafer, "Digital Processing of Speech Signal," Chapter 2, Prentice-Hall, Inc. 1978, for instance.

Figure 2:
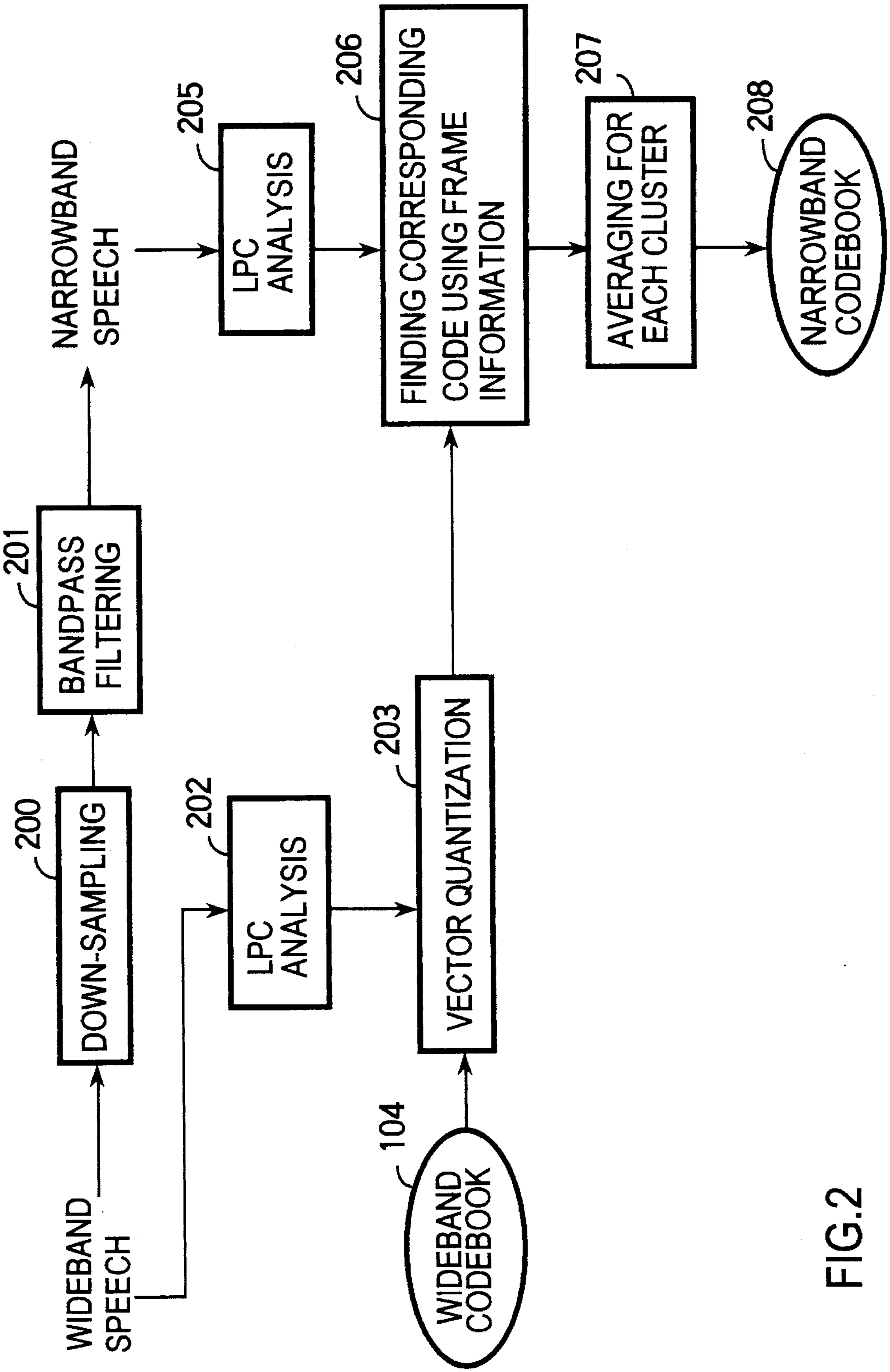
FIG. 2 is a diagram showing the procedure for generating a narrowband speech signal codebook.
Figure 4:
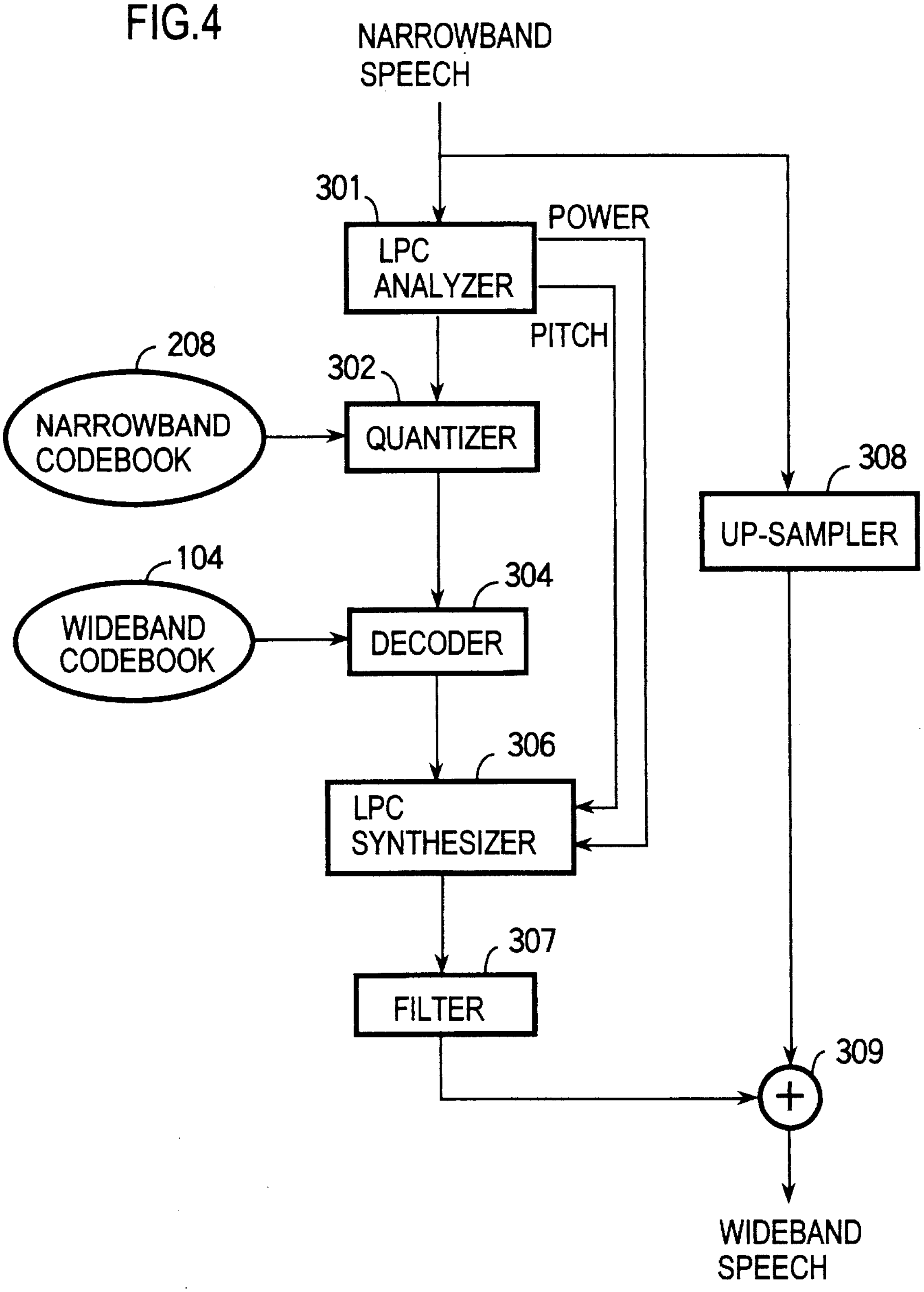
FIG. 4 is a block diagram illustrating an embodiment of the present invention.

The spectrum analysis in step 102 in FIG. 1, steps 202 and 205 in FIG. 2 and in the LPC analyzer 301 in FIG. 4 is to obtain parameters of the same kind by the same analysis method. The training wideband speech signal that is used to generate the narrowband speech signal in FIG. 2 need not always be the wideband speech signal used in the creation of the wideband speech signal codebook 104.

Next, a description will be given, with reference to FIG. 5, of the procedure for producing a representative waveform codebook that is used according to a second aspect of the present invention. The training wideband speech signal used to create the wideband speech signal codebook 104 shown in FIG. 1, or a different training wideband speech signal of about the same frequency band as that of the above is converted by an analog-to-digital (A/D) converter in step 101. In step 102 the digital signal is subjected to LPC analysis to obtain parameters such as spectrum data or information (an auto-correlation function and an LPC cepstrum coefficient). The parameters are assumed to be identical with those used in the production of the codebook 104 in FIG. 1; hence, the parameters obtained in step 103 in FIG. 1 may also be used. These parameters are collected from a sufficiently large number of words, for example, 200 words, and in step 211 the waveform of the frame closest to each codevector is selected by reference to the wideband speech signal codebook 104 produced in FIG. 1. Let it be assumed, for instance, that in the case where the input training wideband speech signal has such a waveform as shown in FIG. 6, Row A and the frames in the LPC analysis are numbered as shown in FIG. 6, Row B, the codevector that is the closest to the LPC analysis result, obtained in step 102, is retrieved from the wideband speech signal codebook 104 for each frame and, as a result, codevectors $V_7$, $V_9$, $V_1$, . . . are determined for the frames Nos. 1, 2, 3, . . . as depicted in FIG. 6, Row C. After completion of the determination of the codevectors for all training wideband speech signals, the same codevector, for example, $V_7$, appears in the frames Nos. 1, 5, 8, . . . in this example, and if that one of these frames which is the closest to the LPC analysis result of the current training wideband speech signal is the frame No. 5, for example, the waveform of the training wideband speech signal in the frame No. 5 is used as a representative waveform segment for the codevector $V_7$. Similarly, representative waveform segments for the other remaining codevectors are selected. In practice, the representative waveform segments are selected in step 211 as follows: The waveform of the training wideband speech signal that has a one analysis window length (in the LPC analysis) centering about each frame of the signal is extracted by one pitch in the case of voiced speech and by one or two analysis window lengths in the case of unvoiced speech, and the extracted waveform is used as the representative waveform segment for the code number concerned. In this way, a representative codebook 212 is produced which has stored therein the representative waveform segments for the respective code numbers of the codebook 104. The frame length is equal to the window shift width in the LPC analysis.

Figure 7:
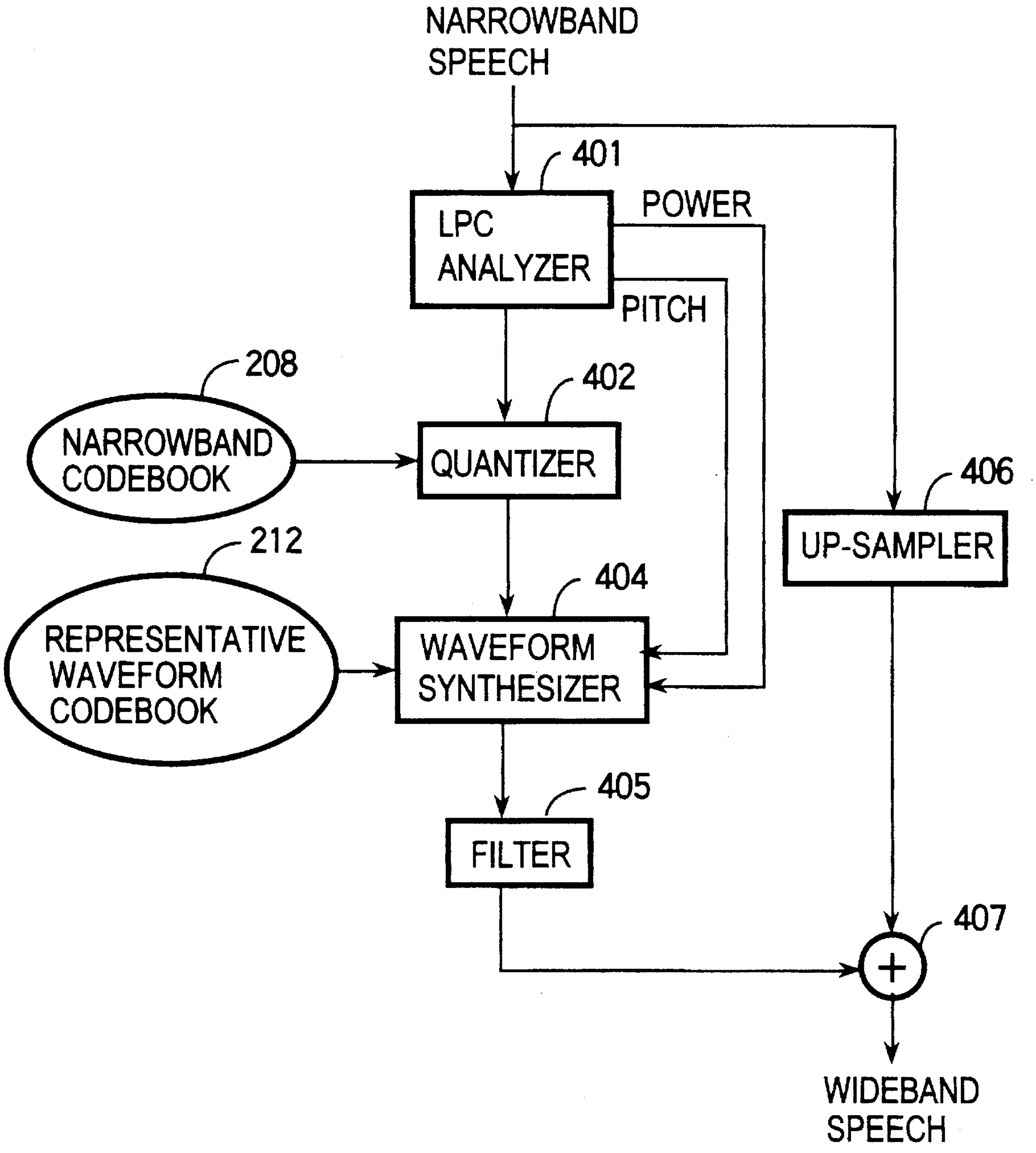
FIG. 7 is a block diagram illustrating another embodiment of the present invention.

Turning next to FIG. 7, a description will be given of the procedure for reconstructing a wideband speech signal from a narrowband speech signal according to the second aspect of the present invention. An input narrowband speech signal of a band ranging from 300 Hz to 3.4 kHz, for instance, is LPC analyzed by an LPC analyzer 401 to obtain the same spectrum parameters as those used in FIG. 1, and the spectrum parameters are vector-quantized by a vector quantizer 402. This vector quantization utilizes the narrowband speech codebook 208 produced by the method described previously in respect of FIG. 2. Next, a wideband speech signal is reconstructed in a waveform synthesizer 404 as follows: First, representative waveform segments corresponding to respective code numbers obtained by the quantizer 402 are extracted by a waveform extractor 404A from the representative waveform codebook 212 produced in FIG. 5. Voiced speech is synthesized by pitch-synchronous overlapping of the extracted representative waveform segments and unvoiced speech is synthesized by randomly using waveforms of a length corresponding to the window shift width (in the LPC analysis). By this, a wideband speech signal of an 8 kHz band, for instance, is reconstructed. This wideband speech signal can be output as a reconstructed signal. The synthesis by pitch-synchronous overlapping is described in E. Moulines, F. Charpentier, "Pitch-synchronous Waveform Processing Techniques for Text-to-Speech Synthesis using Diphones," Speech Communication, Vol. 9, pp. 453–567, Dec. 1990, for instance.

The wideband speech signal obtained by the processing described above contains not only signal components outside the band of the input narrowband speech signal but also signal components inside the band of the input narrowband speech signal; the signal components inside the band of the input signal distort the input narrowband speech signal. A solution to this problem is to perform the processing described below. The wideband speech signal provided by the waveform synthesizer 404 is applied to a band-pass filter 405 to extract frequency components below 300 Hz and those above 3.4 kHz; namely, out-of-band signals outside the band of the input narrowband speech signal are extracted. On the other hand, the input narrowband speech signal is up-sampled by an up-sampler 406 to the 8 kHz band, and the sample values and the out-of-band signals from the band-pass filter 405 are added together by an adder 407 to obtain a reconstructed wideband speech signal.

Figure 8:
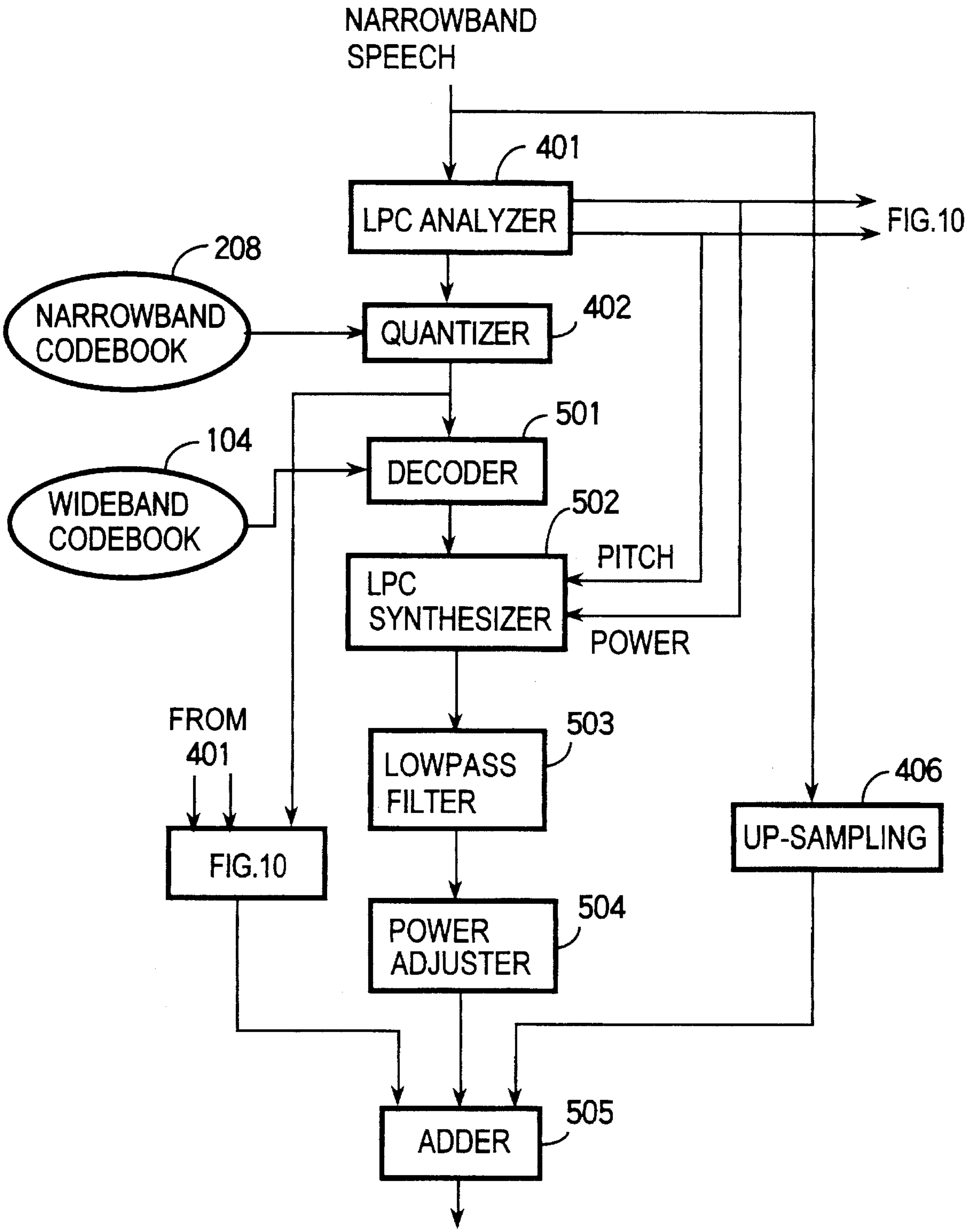
FIG. 8 is a block diagram showing the configuration of a part for reconstructing frequency components lower than an input narrowband speech signal according to the present invention.

In the above, according to a third aspect of the present invention, the reconstruction of the signal components outside the band of the input signal may be limited to the high-frequency side and need not necessarily be used at the low-frequency side. For instance, as shown in FIG. 8, the input narrowband speech signal is LPC-analyzed by the LPC analyzer 401 and the analysis results are vector-quantized by the quantizer 402 using the narrowband speech signal codebook 208 in the same manner as described previously with respect to FIG. 7. In this case, as described previously in respect of FIG. 4, the quantized codes are decoded by a decoder 501 using the wideband speech signal codebook 104, the decoded codevectors are sent to an LPC synthesizer 502 to control the filter coefficient of an LPC speech synthesizer, an excitation signal according to the pitch period obtained by the LPC analyzer 401 is provided to the LPC speech synthesizer, and its output level is controlled in accordance with the level of the LPC analysis. The wideband speech signal thus synthesized is applied to a low-pass filter 503, whereby low-frequency components lower than the input narrowband speech signal, for example, below 300 Hz, are extracted from the wideband speech signal. The analyzed power in the analyzer 401 is the power of the input narrowband speech signal with only band range of 300 Hz to 3.4 kHz, and the LPC synthesizer 502 operates so that this power and the power of the output wideband speech signal of, for example, the 8 kHz band from the LPC synthesizer 502 become equal to each other. Hence, in the band of the input narrowband speech signal the power level of the reconstructed wideband speech signal is lower than the power level of the input narrowband speech signal. A power adjuster 504 increases the output power level from the low-pass filter 503 to a value corresponding to the power level of the input narrowband speech signal. In this way, the low-frequency signal components lower than the input narrowband signal corresponding to the input signal are reconstructed.

Figure 9:
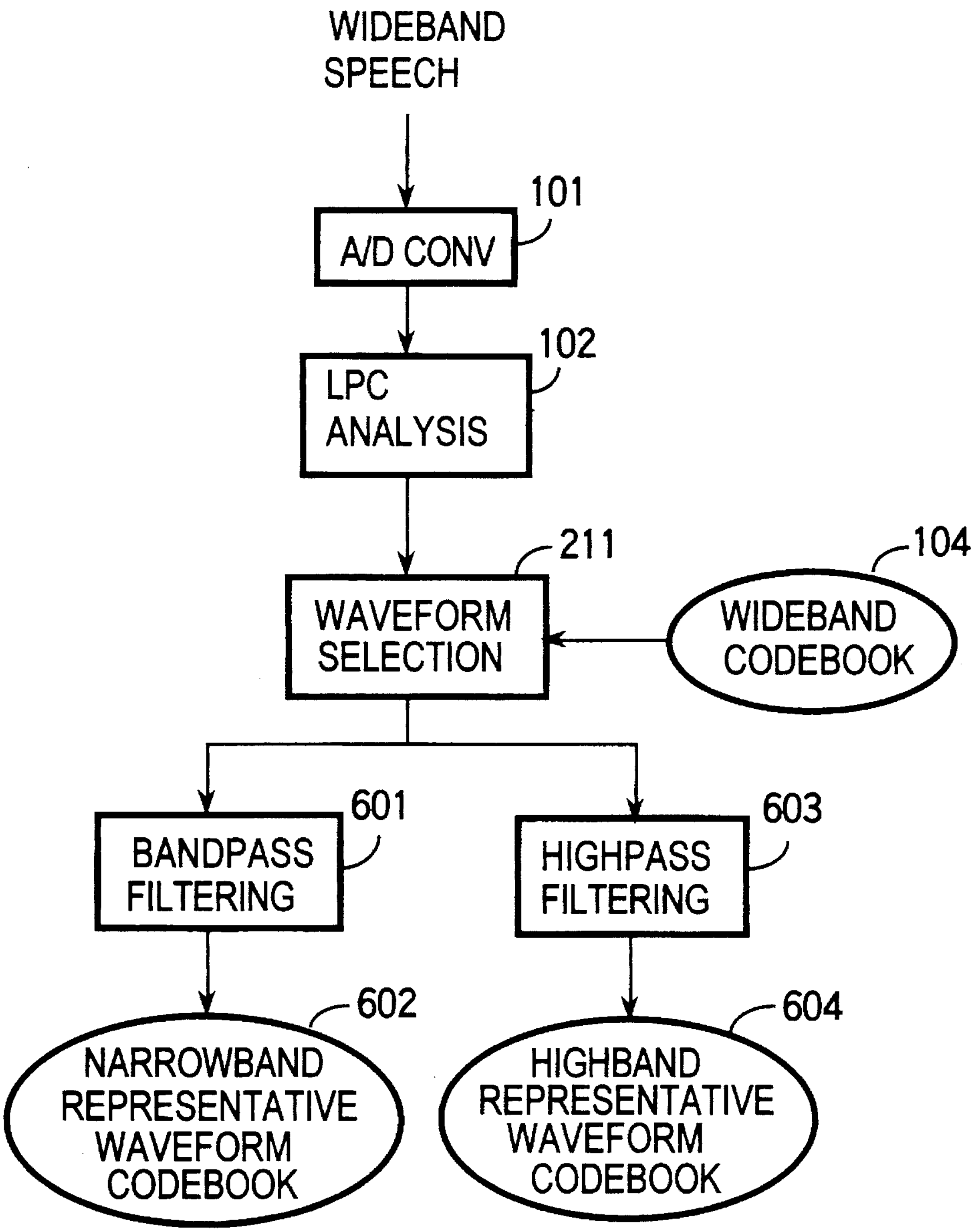
FIG. 9 is a diagram showing the procedures for producing a narrowband representative waveform codebook and a highband representative waveform codebook.

Next, as shown in FIG. 9, two representative waveform codebooks are prepared that are used to reconstruct signal components higher than the input signal band corresponding to the input narrowband speech signal. As in the case of producing the representative waveform codebook 212 from the training wideband speech signal as described previously with respect to FIG. 5, the training wideband speech signal is vector-quantized using the wideband speech signal codebook and, for each code, the waveform segment of the training wideband speech signal that is the closest to the codevector concerned is extracted by one pitch for voiced speech and by one analysis window length for unvoiced speech (step 211). The representative waveform segments thus extracted are passed through a filter having a passband of, for example, 300 Hz to 3.4 kHz (601) to produce a narrowband representative waveform codebook 602. At the same time, the extracted representative waveform segments are provided to a high-pass filter that permits the passage therethrough of frequency components higher than 3.4 kHz (step 603), by which a highband representative waveform codebook 604 is produced.

A description will be given, with reference to FIG. 10, of a method whereby higher frequency signals than the band of the input narrowband speech signal are reconstructed therefrom using both representative waveform codebooks 602 and 604. The representative waveform segments are selected by a narrowband representative waveform selector 701 from the narrowband representative waveform codebook 602 through use of the quantized code numbers. Furthermore, these quantized code numbers are also decoded by a waveform selector 702 to select the representative waveform segments from the highband representative waveform codebook 604. The narrowband and highband representative waveform segments thus selected are provided to decision units 703 and 704 to make a check to see if they are waveform segments of voiced or unvoiced speech. In the case of unvoiced speech, start point selectors 705 and 706 extract the representative waveform segments by steps of one analysis window shift width while randomly selecting the start points of the waveform segments being extracted. In the case of voiced speech, pitch-synchronous overlap units 707 and 708 extract and overlap the selected narrowband and highband representative waveform segments in synchronization with the pitch period obtained by the LPC analyzer 401. The ratios between the power of trains of representative waveform segments extracted by the start point random selector 705 and the pitch-synchronous overlap unit 708 and the power from the LPC analyzer 401 are calculated by power coefficient calculators 709 and 710. In power adjusters 711 and 712, the power levels of trains of representative waveform segments obtained from the start point random selector 706 and the pitch-synchronous overlap unit 708 are multiplied by the above-mentioned ratios, respectively, so that the representative waveform segment trains have power corresponding to that of the input narrowband speech signal. Then the outputs from the power adjusters 711 and 712 are added together by an adder 713. The added output is a reconstructed version of the signal at the higher frequency side in the frequency band of the input narrowband speech signal.

This high-frequency side reconstructed signal is added by the adder 505 in FIG. 8 together with the low-frequency side reconstructed signal and the output from the up-sampler 406 to obtain the wideband speech signal as described previously in conjunction with FIG. 8.

Figure 5:
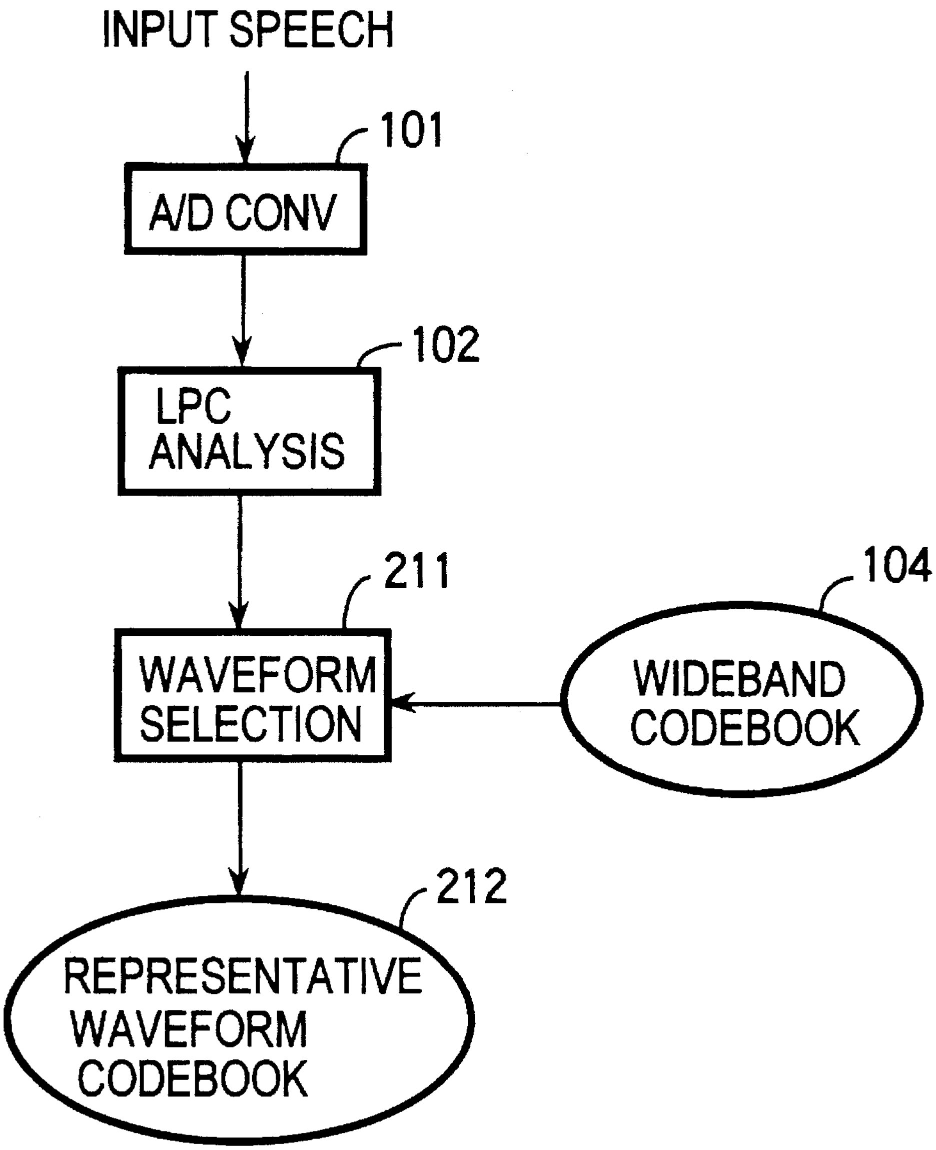
FIG. 5 is a diagram showing the procedure for generating a representative waveform codebook.
Figure 6:
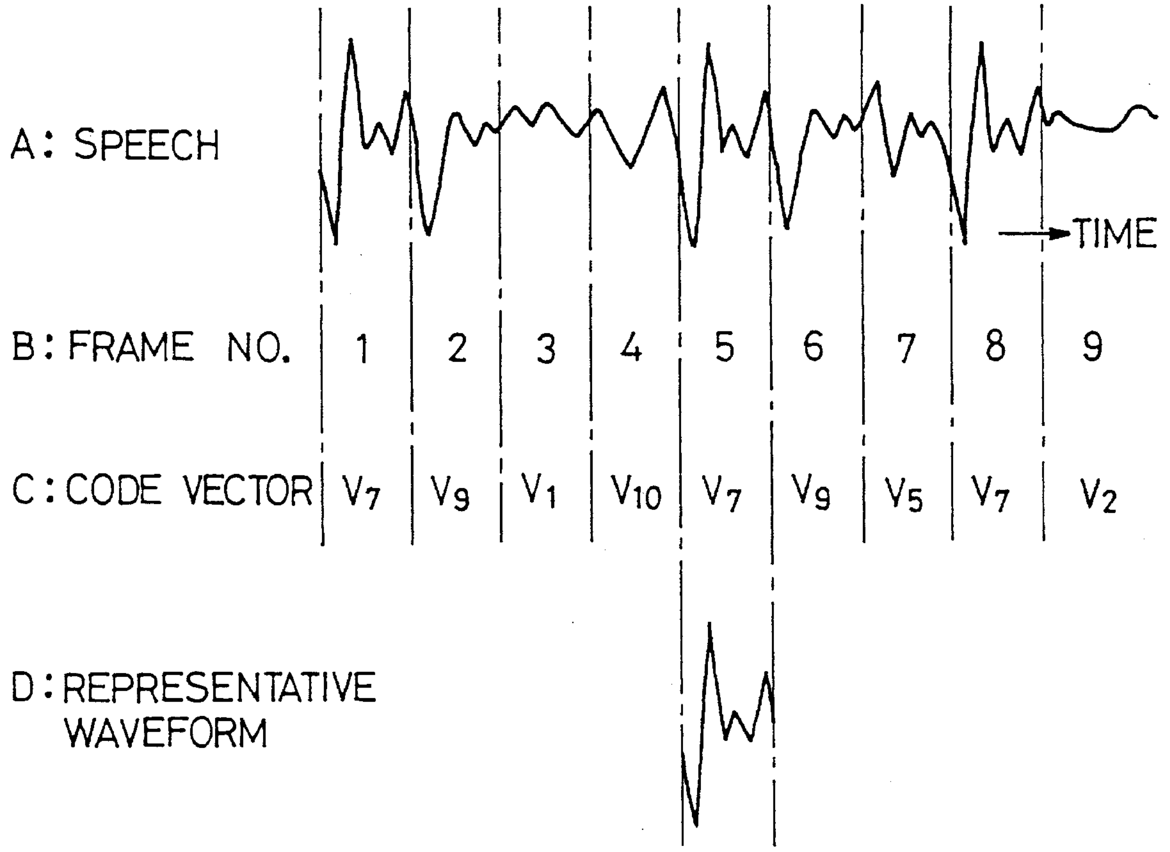
FIG. 6 is a diagram for explaining the operations involved in the procedure of FIG. 5.

The spectrum analysis in step 102 in FIGS. 5 and 9 and in the LPC analyzer 401 in FIGS. 7, and 8 is to obtain parameters of the same kind by the same analysis method. The training wideband speech signal for producing the wideband speech signal codebook 104 and the training wideband speech signal for producing each of the representative waveform codebooks 212, 602 and 604 may be identical with or different from each other.

The following evaluation was made with conditions as follows: 186 phoneme-balanced words were used as training data; a Hamming window was used as the analysis window; the analysis window length was 21 ms; the window shift width was 3 ms; the LPC analysis order was 14th order; the FFT point number was 512; the distance measure used for producing the codebooks was an LPC cepstrum Euclidean distance; the size of the wideband speech signal codebook 104 was 16; and the size of the narrowband speech signal codebook 206 was 256.

(1) A 7.3 kHz band speech signal is input and its spectrum envelopes are obtained. The spectrum envelopes are quantized using the wideband speech signal codebook 104. Square errors of each spectrum envelope before and after the quantization are averaged for the low-frequency band (0 to 300 Hz) and the high-frequency band (300 Hz to 3.4 kHz). This indicates distortion by the vector quantization. (2) A telephone-band speech signal (300 Hz to 3.4 kHz) is extracted from the above-mentioned 7.3 kHz band speech signal and is then quantized using the codebook 208, and the quantized code numbers are decoded using the wideband speech signal codebook 104. The decoded code numbers are LPC-synthesized, that is, spectrum envelope of the output from the LPC synthesizer 306 in FIG. 4 is obtained, and square errors of this spectrum envelope relative to the spectrum envelope of the 7.3 kHz band input speech signal are averaged for the low- and high-frequency bands. This indicates distortion by the reconstruction of the wideband speech signal from the narrowband speech signal.

Figure 11A:
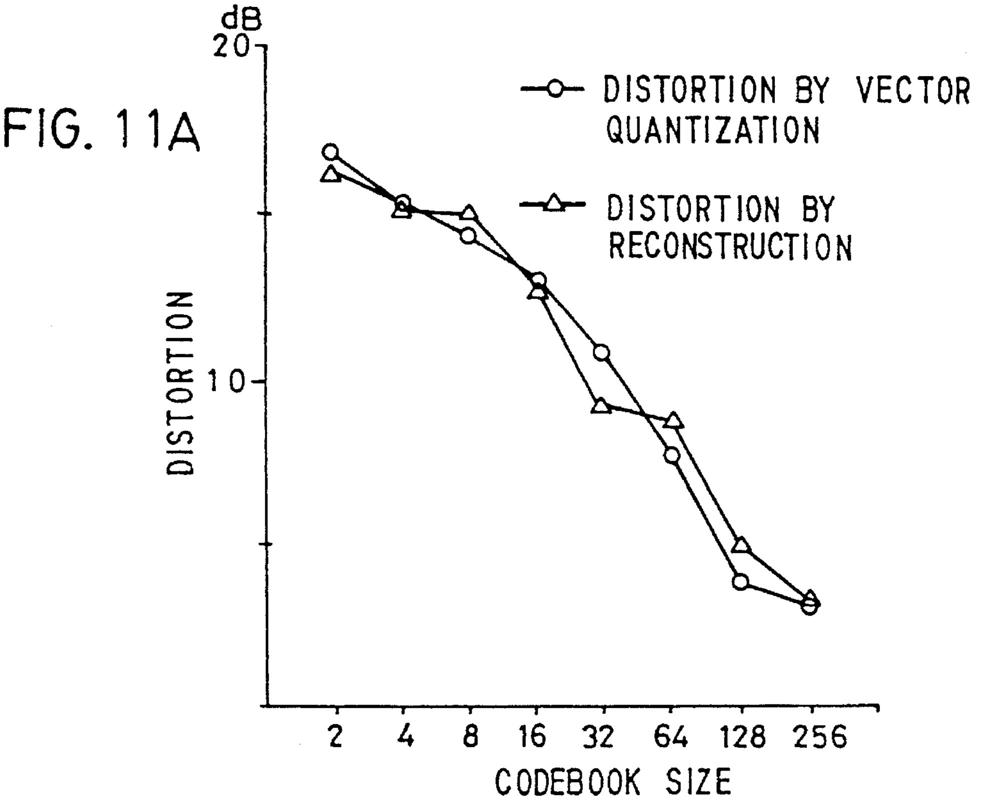
FIGS. 11A and 11B are graphs showing the relationships between distortion by vector quantization, distortion by reconstruction according to the present invention and the codebook size.
Figure 11B:
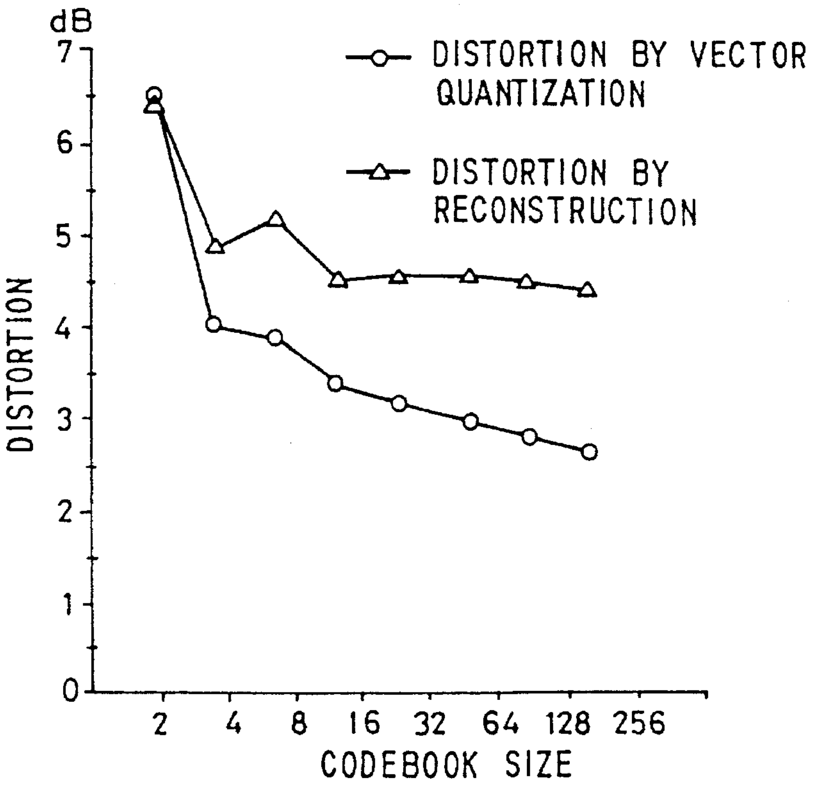

The results of such calculations in the above are shown in FIGS. 11A and 11B, the abscissa representing the size of the codebook 104 (208) and the ordinate representing distortion. FIG. 11A shows the calculated values for the low-frequency band and FIG. 11B for the high-frequency band. As will be seen from FIG. 11A, distortion by vector quantization and distortion by reconstruction of the wideband speech signal both decrease with an increase in the codebook size; there is no substantial difference between them. This means that the reconstruction at the lower frequencies is effectively accomplished and that the distortion by reconstruction is about the same as the distortion by vector quantization. On the other hand, in the high-frequency band each distortion decreases with an increase in the codebook size, but the distortions do not sharply decrease in the same way as in the low-frequency band and the distortion by reconstruction is larger than the distortion by vector quantization.

Next, a description will be given of the results of listening tests by an ABX method.

Telephone band speech and 7.3 kHz band speech were randomly presented as stimuli A and B. Speech X presented third was selected from (1) to (5) listed below.

(1) Telephone band speech (2) 7.3 kHz band speech (3) Speech by the reconstruction method of FIG. 4

Figure 10:
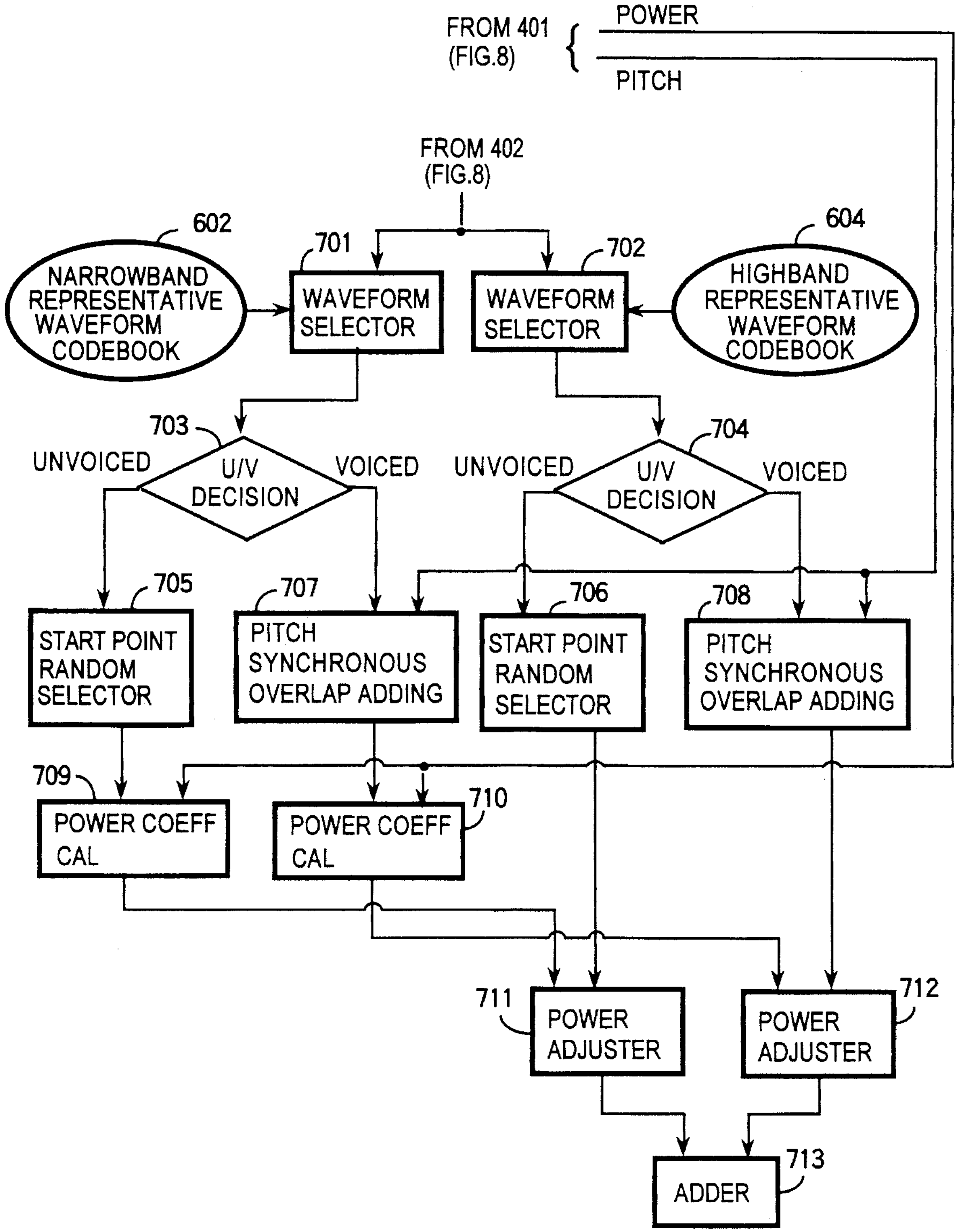
FIG. 10 is a block diagram illustrating the configuration of a part for reconstructing frequency components higher than the input narrowband speech signal according to the present invention.

(4) Speech by the reconstruction method described with respect to FIGS. 8 and 10

(5) Speech obtained by adding the telephone band speech with low- and high-frequency components of LPC analyzed-synthesized version of the speech (2)

Considering that the speech (5) would be the best reconstructed speech in the case of using the LPC system, six examinees or listeners were asked to select the stimulus A or B as being closest to the speech X. A total of 125 triplets of speech were presented to each examinee via a headphone. The ratio at which the speech X was judged as being closest to the 7.3 kHz band speech is as follows:

| (1) | (2) | (3) | (4) | (5) |
|---|---|---|---|---|
| 6.9% | 96.9% | 75.7% | 86.2% | 86.4% |

The results that the reconstructed speech (3) and (4) according to the present invention and the reconstructed speech (5) by the LPC analysis-synthesis are closest to the 7.3 kHz band speech are 75.7%, 86.2% and 86.4%—all above 75%. This demonstrates that both reconstruction methods of the present invention produce excellent results. Since the ratios (4) and (5) are remarkably close to each other, it will be understood that the reconstruction method (4) excels method (3) and ensures the reconstruction of the wideband speech signal with an appreciably high degree of accuracy.

As described above, according to the present invention, it is possible to efficiently reconstruct features of a speech signal absent in a narrowband signal through utilization of the correspondence or association between features of the narrowband speech signal and a wideband speech signal. Moreover, the use of representative speech waveform segments permits reconstruction of speech of particularly high quality.

The present invention utilizes the facts that the correlation between the spectrum, outside the frequency band of the narrowband speech signal, in the wideband speech signal and narrowband speech spectrum is relatively high and that this relationship is independent on the speaker or talker. Thus, the invention ensures easy reconstruction of high quality wideband speech signals through utilization of conventional speech analysis-synthesis techniques.

It will be apparent that many modifications and variations may be effected without departing from the scope of the novel concepts of the present invention.

What is claimed is:

1. A wideband speech signal reconstruction method comprising:

a first step wherein an input narrowband speech signal is spectrum-analyzed;

a second step wherein the spectrum-analyzed results obtained in said first step are vector-quantized using a narrowband speech signal codebook;

a third step wherein the quantized values obtained in said second step are decoded to codevectors using a wideband speech signal codebook; and a fourth step wherein said codevectors obtained in said third step are spectrum-synthesized to obtain a wideband speech signal.

2. The method of claim 1 further comprising:

a fifth step wherein said input narrowband speech signal is up-sampled to compute sample values;

a sixth step wherein frequency components outside the band of said input narrowband speech signal are extracted from said wideband speech signal obtained in said fourth step; and a seventh step wherein said out-of-band frequency components obtained in said sixth step are added to said sample values obtained in said fifth step to obtain a wideband speech signal.

3. The method of claim 1 or 2 wherein said narrowband speech signal codebook is composed of codevectors obtained by: spectrum-analyzing a training wideband speech signal; vector-quantizing the results of said spectrum analysis through use of a wideband speech signal codebook; extracting a narrowband speech signal from said training wideband speech signal; spectrum-analyzing said extracted narrowband speech signal; sequentially associating the results of said spectrum analysis and the results of said vector quantization with each other to form clusters; and averaging the results of said spectrum analysis of said extracted narrowband speech signal for each cluster.

4. A wideband speech signal reconstruction method comprising:

a first step wherein an input narrowband speech signal is spectrum-analyzed;

a second step wherein the spectrum-analyzed results obtained in said first step are vector-quantized using a narrowband speech signal codebook; and a third step wherein the quantized values obtained by said vector quantization in said second step are reconstructed to obtain a wideband speech signal through use of a representative waveform codebook.

5. The method of claim 4 further comprising:

a fourth step wherein said input narrowband speech signal is up-sampled to compute sample values;

a fifth step wherein frequency components outside the band of said input narrowband speech signal are extracted from said wideband speech signal obtained in said third step; and a sixth step wherein said out-of-band frequency components obtained in said filth step and said sample values obtained in said fourth step are added together to obtain a wideband speech signal.

6. The method of claim 4 or 5 wherein said representative waveform codebook is composed of representative waveform segments obtained by a procedure wherein a training wideband speech signal is spectrum-analyzed, the spectrum-analyzed results are matched with a wideband speech signal codebook and, for each code of said codebook, the waveform of said training wideband speech signal corresponding to the spectrum-analyzed result closest to the codevector of the code is selected by one pitch for voiced speech and by one to two analysis window lengths for unvoiced speech, said selected waveform being used as a representative segment of the said code.

7. A wideband speech signal reconstruction method comprising:

a first step wherein an input narrowband speech signal is spectrum-analyzed;

a second step wherein the spectrum-analyzed results in said first step are vector-quantized using a narrowband speech signal codebook;

a third step wherein the quantized values obtained in said second step are decoded to codevectors, using a wideband speech signal codebook;

a fourth step wherein the codevectors decoded in said third step are spectrum-synthesized to a wideband speech signal;

a fifth step wherein frequency components lower than the band of said input narrowband speech signal are extracted from said wideband speech signal obtained in said fourth step;

a sixth step wherein said quantized values obtained in said second step are decoded to obtain a high-frequency speech signal, using a representative waveform codebook of a high-frequency speech signal higher than the band of said input narrowband speech signal;

a seventh step wherein said input narrowband speech signal is up-sampled to compute sample values; and an eighth step wherein said lower-frequency components obtained in said fifth step, said high-frequency speech signal obtained in said sixth step and said sample values computed in said seventh step are added together to obtain a wideband speech signal.

8. The method of claim 4, 5, or 7 wherein, in the reconstruction of said quantized values to a speech signal through use of said representative waveform codebook, waveform segments of said representative waveform codebook corresponding to said quantized values are overlapped pitch-synchronously for voiced speech and waveforms of a length corresponding to an analysis window shift width are randomly selected for unvoiced speech.

9. The method of claim 7 further comprising a ninth step wherein the power of said lower-frequency components extracted in said fifth step is increased to a level corresponding to the power of said narrowband signal before being supplied to said eighth step, and a tenth step wherein the power of said high-frequency speech signal obtained in said sixth step is adjusted in accordance with the power of said input narrowband speech signal.

10. The method of claim 9 wherein said ninth step also decodes said quantized values obtained in said second step to codevectors, using a narrowband representative waveform codebook, spectrum synthesizes said decoded codevectors to obtain a narrowband speech signal, obtains the ratio between the power of said narrowband speech signal and the power of said lower-frequency components obtained in said fifth step, and multiplies the power of said high-frequency speech signal obtained in said sixth step by said ratio.

11. A wideband speech signal reconstructing apparatus comprising:

means for spectrum-analyzing an input narrowband speech signal;

means for vector-quantizing the results, obtained by said spectrum-analyzing means, by use of a narrowband speech signal codebook;

means for decoding the vector-quantized values, obtained by said vector-quantizing means, to codevectors through use of a wideband speech signal codebook; and means for spectrum-synthesizing said codevectors, obtained by said decoding means, to obtain a synthesized wideband speech signal.

12. The apparatus of claim 11 further comprising:

means for up-sampling said input narrowband speech signal to compute sample values;

filter means for extracting out-of-band components outside the band of said input narrowband speech signal from said synthesized wideband speech signal; and means for adding said out-of-band components to said sample values to obtain a wideband speech signal.

13. A wideband speech signal reconstructing apparatus comprising:

means for spectrum-analyzing an input narrowband speech signal;

means for vector-quantizing the results, obtained by said spectrum-analyzing means, by use of a narrowband speech signal codebook; and speech synthesizing means utilizing a representative waveform codebook for reconstructing the vector-quantized values, obtained by said vector-quantizing means, to obtain a synthesized wideband speech signal.

14. The apparatus of claim 13 further comprising:

means for up-sampling said input narrowband speech signal to compute sample values;

filter means for extracting out-of-band components outside the band of said input narrowband speech signal from said synthesized wideband speech signal obtained by said speech synthesizing means; and means for adding together said out-of-band components and said sample values to obtain a wideband speech signal.

15. A wideband speech signal reconstructing apparatus comprising:

means for spectrum-analyzing an input narrowband speech signal;

means for vector-quantizing the results, obtained by said spectrum-analyzing means, by use of a narrowband speech signal codebook;

means for decoding the quantized values, obtained by said vector-quantizing means, to codevectors through use of a wideband speech signal codebook;

first speech synthesizing means for spectrum-synthesizing said codevectors, obtained by said decoding means, to obtain a wideband speech signal;

filter means for extracting, from said wideband speech signal obtained by said first speech synthesizing means, frequency components lower than the band of said input narrowband speech signal;

second speech synthesizing means for decoding said quantized values, obtained by said vector-quantizing means, to obtain a high-frequency speech signal through use of a representative waveform codebook of a high-frequency speech signal higher than the band of said input narrowband speech signal;

means for up-sampling said input narrowband speech signal to compute sample values; and means for adding together said lower-frequency components obtained by said filter means, said high-frequency speech signal obtained by said second speech synthesizing means, and said sample values obtained by said up-sampling means, to obtain a wideband speech signal.

16. The apparatus of claim 15 further comprising:

first power adjusting means for increasing the power of said lower-frequency components at a fixed ratio and supplying the increased power lower-frequency components to said adding means; and second power adjusting means for adjusting the power of said high-frequency speech signal in accordance with the power of said input narrowband speech signal and supplying the power adjusted high-frequency speech signal to said adding means.

* * * * *